United States Patent
Satoh

(10) Patent No.: US 7,865,029 B2
(45) Date of Patent: Jan. 4, 2011

(54) IMAGE PROCESSING DEVICE AND METHOD

(75) Inventor: Hiroshi Satoh, Yokohama (JP)

(73) Assignee: Nissan Motor Co., Ltd., Yokohama-shi, Kamagawa (JP)

( * ) Notice: Subject to any disclaimer, the term of this patent is extended or adjusted under 35 U.S.C. 154(b) by 1248 days.

(21) Appl. No.: 10/581,708

(22) PCT Filed: Oct. 13, 2005

(86) PCT No.: PCT/IB2005/003056

§ 371 (c)(1),
(2), (4) Date: Jun. 5, 2006

(87) PCT Pub. No.: WO2006/040662

PCT Pub. Date: Apr. 20, 2006

(65) Prior Publication Data

US 2007/0110331 A1    May 17, 2007

(30) Foreign Application Priority Data

Oct. 14, 2004  (JP)  ............................. 2004-300568
Mar. 30, 2005  (JP)  ............................. 2005-098588

(51) Int. Cl.
*G06K 9/40*  (2006.01)
(52) U.S. Cl. ...................................... 382/254; 348/607
(58) Field of Classification Search ................. 382/100, 382/254, 255, 260, 261, 262, 263, 264, 266, 382/274, 275; 348/606–624; 358/1.9–3.31
See application file for complete search history.

(56) References Cited

U.S. PATENT DOCUMENTS

| 5,909,244 | A  | * | 6/1999 | Waxman et al. ........... 348/222.1 |
| 6,061,092 | A  | * | 5/2000 | Bakhle et al. ............... 348/243 |
| 6,901,173 | B2 | * | 5/2005 | Alderson et al. ............ 382/312 |
| 7,209,221 | B2 | * | 4/2007 | Breed et al. ................ 356/5.02 |
| 7,505,604 | B2 | * | 3/2009 | Zakrzewski et al. ......... 382/100 |
| 2002/0050518 | A1 | * | 5/2002 | Roustaei ..................... 235/454 |
| 2008/0046150 | A1 | * | 2/2008 | Breed .......................... 701/45 |
| 2010/0057305 | A1 | * | 3/2010 | Breed .......................... 701/47 |

FOREIGN PATENT DOCUMENTS

| EP | 0 849 941 A2 | 6/1998 |
| JP | 2000-125206 | 4/2000 |
| JP | 2004-343584 A | 12/2004 |
| WO | WO 2004/021696 | 3/2004 |

OTHER PUBLICATIONS

Narendra P.M., et al., "Shutterless Fixed Pattern Noise Correction For Infrared Imaging Arrays". Proceedings of the SPIE, SPIE, Bellingham, VA, USA; vol. 282, Apr. 21, 1981, pp. 44-51; XP 000991499.
PCT International Search Report and the Written Opinion of the International Searching Authority dated Sep. 28, 2006.

* cited by examiner

*Primary Examiner*—Anand Bhatnagar
(74) *Attorney, Agent, or Firm*—Young Basile

(57) ABSTRACT

A vehicle-mounted image-processing device and method is provided to remove fixed pattern noise from images due to the image pickup element. Images captured consecutively with a camera are superimposed and stored in an image memory. A controller extracts the high spatial frequency component from the stored images, and the images are corrected with the extracted high spatial frequency component used as the correction data for removing the fixed pattern noise.

39 Claims, 8 Drawing Sheets

IMAGE PROCESSING DEVICE AND METHOD

BACKGROUND

The present invention relates to an image processing device and method for removing noise from images that have been captured from a camera mounted on a vehicle or other moving object.

Fixed pattern noise (FPN) is an unwanted signal component that may be constant or slowly changing with time, but might vary spatially. Fixed pattern noise may be generated in images captured with a CMOS sensor and other image pick-up devices, including those mounted on vehicles. It is desirable to remove fixed pattern noise.

Japanese Kokai Patent Application No. 2002-344816 discloses an approach for removing fixed pattern noise by closing the shutter of an image pick-up device during a noise extraction mode. When the shutter is closed, the signal level of the pixels output from the image pickup device is extracted as the fixed pattern noise. When the operation mode is switched to the correction mode, based on correction data computed from the fixed pattern noise extracted in the noise extraction mode, the shutter is opened to remove the noise from the image that has been captured.

SUMMARY OF THE INVENTION

It would be desirable to provide a device and method for removing fixed pattern noise that would be effective and expedient, and that did not necessarily require that a shutter be closed to extract correction data, and that could allow for correction of FPN while images are captured on a consecutive or real-time basis.

In accordance with one aspect of the present invention, an image processing device is provided for removing fixed pattern noise in images captured by an image pickup device mounted on a vehicle. The image processing system includes a memory on which is stored multiple images captured by the image pickup device while the vehicle is running; and a controller adapted to generate correction data by extracting the high spatial frequency components from portions of the stored images and to use the correction data to remove fixed pattern noise from images captured by the image pickup device.

In accordance with another aspect of the present invention, an image processing method is provided for removing fixed pattern noise from images captured by an image pickup device mounted on a vehicle. The method includes storing one or more images captured with the image pickup device; extracting the high spatial frequency component contained in the stored images; generating correction data for removing the fixed pattern noise based on the extracted high spatial frequency component; and using the correction data to remove fixed pattern noise from the images captured the image pickup.

BRIEF DESCRIPTION OF THE DRAWINGS

The description herein makes reference to the accompanying drawings wherein like reference numerals refer to like parts throughout the several views, and wherein.

DETAILED DESCRIPTION

First Embodiment

Figure 1:
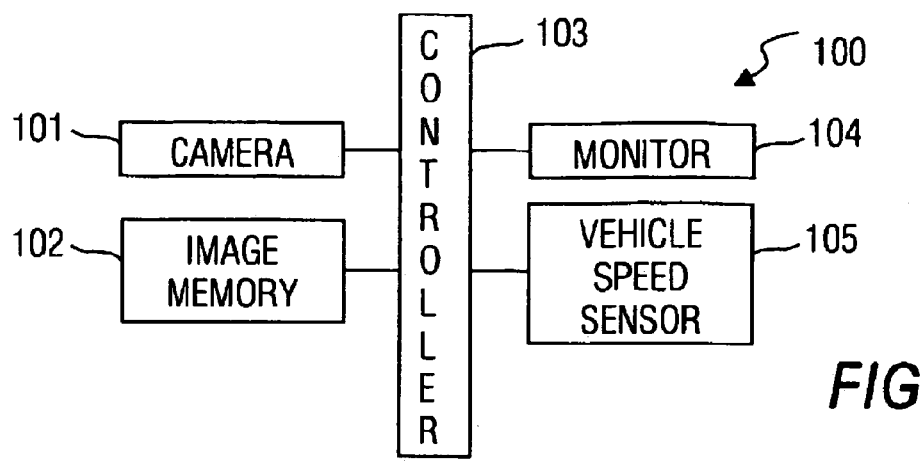
FIG. 1 is a block diagram of an image processing device according to a first embodiment of the invention.

FIG. 1 is a block diagram illustrating the construction of an embodiment of the vehicle-mounted image processing device as the first embodiment of the present invention. In this case, vehicle-mounted image processing device 100 is carried on a vehicle, and it is composed of a camera 101 for taking pictures in front of the vehicle itself, image memory 102 for storing the images that have been captured with the camera 101, controller 103 for executing an image process to be explained later to remove the noise of the images, monitor 104 for displaying the images, and vehicle speed sensor 105 for detecting the speed of the vehicle itself.

Camera 101 has, e.g., a CMOS sensor as the image pickup element, and, when movement of the vehicle itself is detected based on the output from vehicle speed sensor 105, images in front of the vehicle are captured consecutively at a prescribed time interval $\Delta t$. The images captured during operation of the vehicle are displayed on monitor 104, and, at the same time, they are output to image memory 102 and are stored as stored images as explained later. In this case, a fixed pattern noise (FPN) is usually generated in images captured with a CMOS sensor. Consequently, it is necessary to remove such noise. As will be explained later, controller 103 extracts FPN correction data from the images stored in image memory 102 to perform FPN correction to remove the noise.

Figure 2:
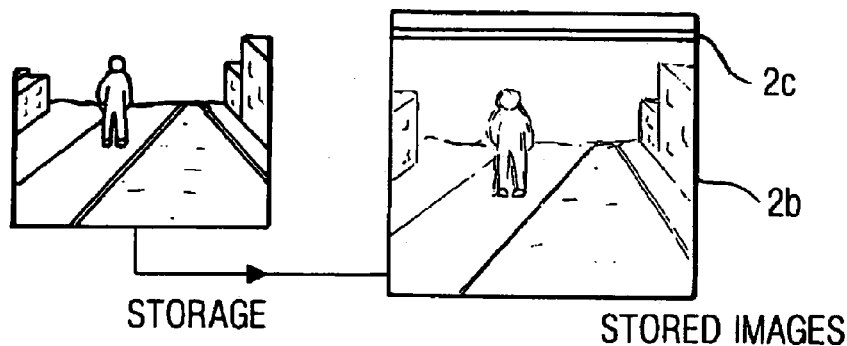
FIG. 2 is a diagram illustrating a specific example of the stored images in the first embodiment.
Figure 3A:
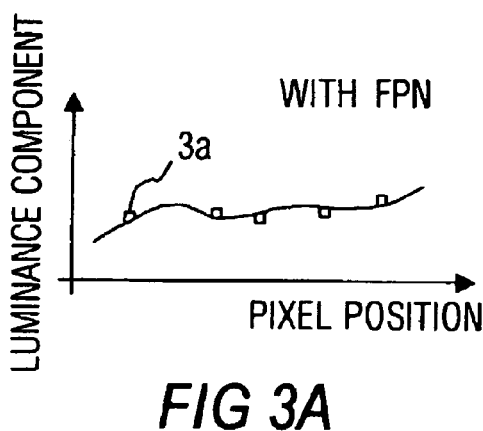
FIG. 3A is a graph of luminance output value at each pixel horizontal position along a lateral line of a stored image in the first embodiment, when FPN is generated.
Figure 3B:
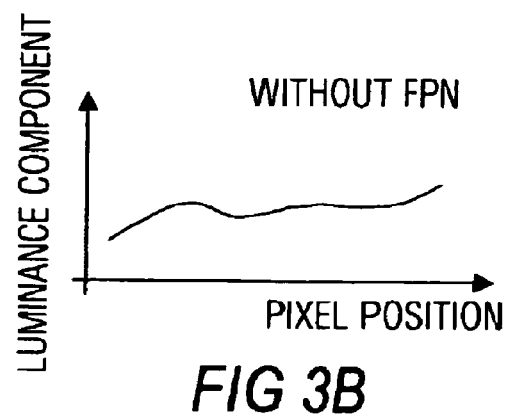
FIG. 3B is a graph of luminance output value at each pixel horizontal position along a lateral line of a stored image in the first embodiment, when FPN is not generated.
Figure 3C:
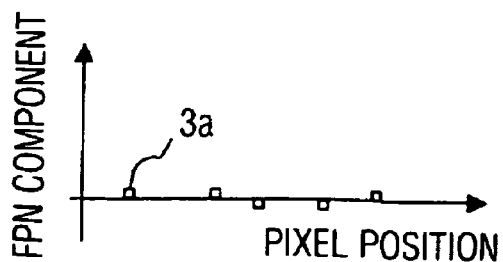
FIG. 3C is a graph of the FPN component value extracted from the luminance output value shown in FIG. 3A, plotted for each pixel horizontal position along the lateral line of the stored image.

Controller 103 reads the stored images from image memory 102. For the stored images, while the vehicle is operation, the images in front of the vehicle captured consecutively by camera 101 at a prescribed time interval are superimposed and stored. As shown in FIG. 2, the images have an unclear shape or contour, that is, the images are blurred. A region divided in the horizontal direction for the images of the stored images 2b is set as lateral line 2c. The lateral line 2c has a height of a prescribed number of pixels, such as 1 pixel, in the image vertical direction. FIGS. 3A-3C are diagrams illustrating the results of the luminance output value at the positions of the various pixels in the horizontal direction in the region on stored images 2b surrounded by the lateral line 2c.

As shown in FIG. 3A, in the graph illustrating the characteristics of the luminance output value with respect to the pixel position in the horizontal direction on lateral line 2c, usually, the high frequency component as indicated by symbol 3a is detected at a prescribed pixel position due to generation of FPN. In the lateral line 2c, if FPN is not generated, because stored images 2b are blurred images, they are images free of a high spatial frequency component, and they are expected to have the characteristics shown in FIG. 3B. In consideration of this fact, for the characteristics of the luminance output value with respect to the pixel position in the horizontal direction of lateral line 2c shown in FIG. 3A, when a high pass filter (HPF) is applied to extract the high spatial frequency component in lateral line 2c, as shown in FIG. 3C, it is possible to extract only the FPN component with respect to the pixel position in the horizontal direction of lateral line 2c.

Consequently, by extracting the high spatial frequency component for each lateral line 2c with respect to the overall stored images 2b, it is possible to extract the FPN component generated in the pixel unit in stored images 2b. With the extracted FPN component of pixel unit as the FPN correction data, FPN correction is performed for the images captured consecutively with camera 101. That is, the difference between each of the images captured consecutively with camera 101 and the FPN correction data is computed, and the computing result is output as the image after FPN correlation to monitor 104. As a result, it is possible to remove the fixed pattern noise from the images captured and to display them on monitor 104. Also, in the first embodiment, when commencement of operation of the vehicle is detected based on the output from vehicle speed sensor 105, the FPN correction is executed with a prescribed time interval of, e.g., 1 sec.

Figure 4:
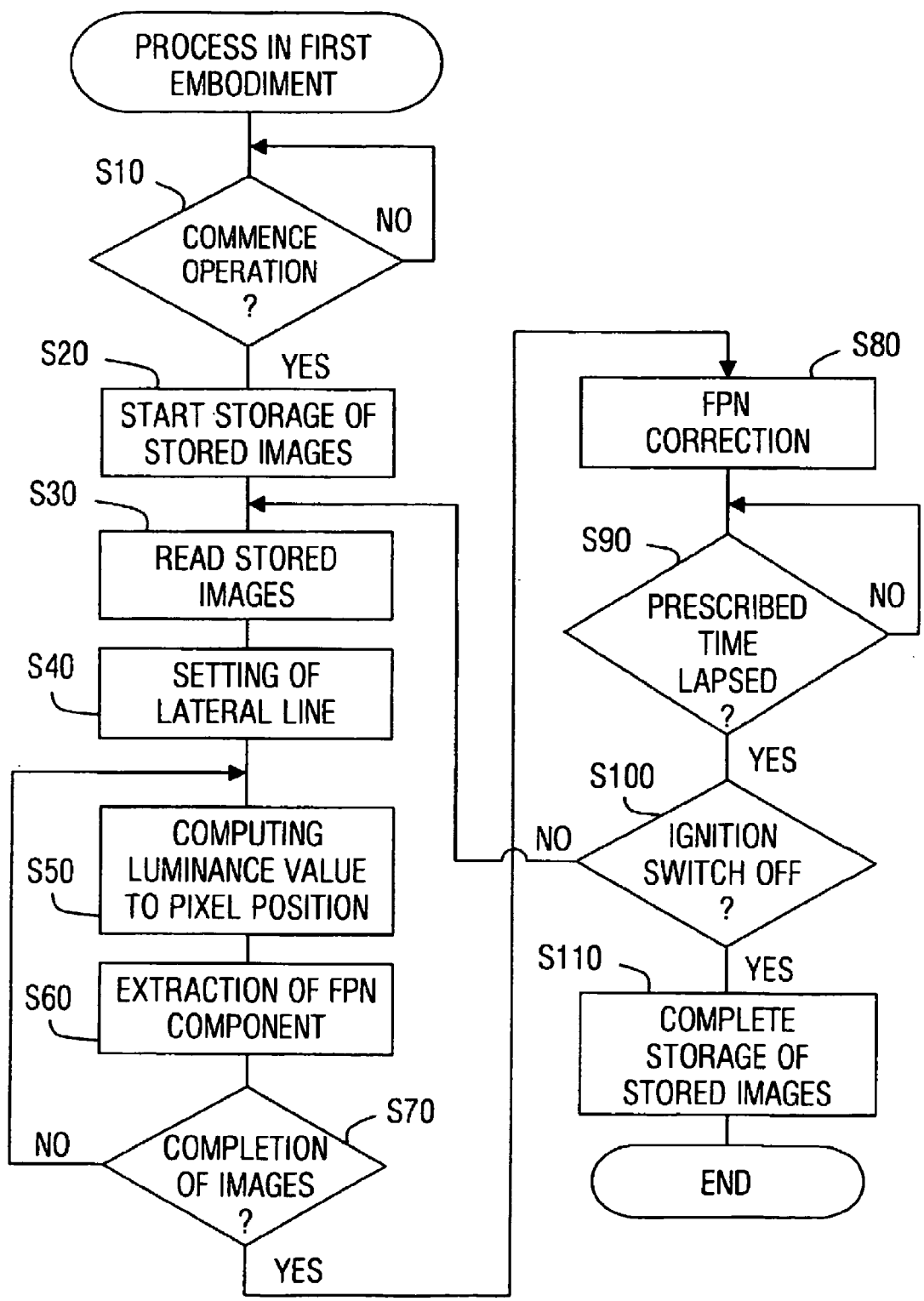
FIG. 4 is a flow chart illustrating the operation of the image processing device shown in FIG. 1.

FIG. 4 is a flow chart illustrating the process of vehicle-mounted image processing device 100 in the first embodiment. The processing shown in FIG. 4 is executed by controller 103 when the ignition switch of the vehicle is turned ON and the power source of vehicle-mounted image processing device 100 is turned ON. In step S1O, a decision is made as to whether the vehicle has begun operation based on the output from vehicle speed sensor 105. When it is decided that the vehicle itself has started operation, the process goes to step S20. In step S20, storage of the images captured with camera 101 in image memory 102 is started. That is, the images captured consecutively with camera 101 are superimposed and stored to obtain stored images 2b. Then, the process goes to step S30, and reading of stored images 2b from image memory 102 is started. The flow then goes to step S40.

In step S40, the lateral line 2c is set with respect to read stored images 2b, and the process goes to step S50. In step S50, the luminance output value at each pixel position in the horizontal direction in lateral line 2c is computed. Then the process goes to step S60, in which HPF is applied to the characteristics of the luminance output value with respect to the pixel position in the horizontal direction in lateral line 2c, and the FPN component is extracted with respect to the pixel position in the horizontal direction in lateral line 2c. Then the process goes to step S70, and a decision is made as to whether the process of step S50 and step S60 has been performed for all stored images 2b. When it is decided that the process has not been finished for all stored images 2b, the process of step S50 and step S60 is repeated until completion of the process for all stored images 2b. When the process is considered complete for all stored images 2b, it then goes to step S80.

In step S80, as explained above, extracted FPN component is used as the FPN correction data, and the FPN correction is performed for the images captured consecutively with camera 101. Then the process goes to step S90, and a decision is made as to whether the prescribed time set as the interval for execution of the FPN correction has elapsed. When it is decided that the prescribed time has not elapsed, the process stops at step S90 until the prescribed time has elapsed. When it is determined that the prescribed time has elapsed, the process goes to step S1OO.

In step S1OO, a decision is made as to whether the ignition switch of the vehicle is OFF. If it is not OFF, the process returns to step S30, and the process is repeated. On the other hand, if it is decided that the ignition switch is OFF, the process goes to step SI 10. In step SI 1O, storage of stored images 2b is completed, stored images 2b stored in image memory 102 are deleted, and the process comes to an end.

In the first embodiment, the following operation and effects can be realized.

(1) Based on the stored images obtained by superimposing the images captured consecutively with camera 101, FPN correction data are extracted, and FPN correction is performed for the images captured. As a result, it is possible to obtain FPN correction data while the images are captured, so extraction of the correction data in real time is possible.

(2) Based on the FPN correction data computed in real time as aforementioned, FPN correction is executed. As a result, correction is possible always with the newest FPN correction data for FPN that is prone to variation in temperature and to variation over time. Consequently, it is possible to output images with high image quality and little noise.

(3) Because the FPN correction data are computed based on the stored images captured consecutively with camera 101, there is no need to carry any dedicated equipment for computing the FPN correction data, and this cuts the cost.

(4) When operation of the vehicle is detected, storage of the stored images is started, and the storage continues until the ignition switch of the vehicle is OFF. As a result, the longer the time period from commencement of operation, the greater the image-sample base of stored images, so that it is possible to obtain enough blurred images to thereby improve the precision of the computed FPN correction data.

Second Embodiment

In the first embodiment, after the vehicle starts operation, the images captured consecutively with camera 101 for the scene in front of the vehicle at a prescribed time interval of Δt are stored to obtain stored images until the vehicle stops. In the second embodiment, however, the behavior of the vehicle with the image processing device carried on it, such as yawing and cornering, is monitored. When yawing takes place in the vehicle itself, variation in the images captured consecutively in the lateral direction becomes significant. Consequently, in order to be able to take sufficient blurred images in a short storage time, the optimum storage time of the picked up images for obtaining the stored images is computed based on the yawing rate detected at this time.

Then, only in the computed storage time are the images stored in image memory 102, and, based on the stored images obtained in this case, the FPN correction data are computed and FPN correction is executed for the images as explained above with respect to the first embodiment. Regarding the block diagram shown as FIG. 1, the specific example of the stored images shown in FIG. 2, and the actual example of the graph showing luminance output values at the various pixel positions in the horizontal direction in lateral line 2c shown in FIGS. 3A-3C, the state is the same as that in the first embodiment, so their explanation will not be repeated.

Controller 103 computes the movement distance of the object on the images from the plural frames of images captured consecutively with camera 101, and, if the computed movement of the object in the lateral direction exceeds a prescribed level, yawing of the vehicle itself is detected. In this case, it computes the yawing rate. Based on the computed yawing of the vehicle itself, the storage time is computed using following formulas (1) and (2). That is, if the storage time is ΔT and the computed yawing is Δθ, movement θ of the images during the storage time ΔT in company with yawing of the vehicle itself is computed using following formula (1).

$$\theta = \Delta\theta \cdot \Delta T \qquad (1)$$

Also, if the image pickup angle of camera 101 is φ, and the number of pixels in the horizontal direction of the image pickup element (CMOS sensor) is N, pixel number M stored in stored images 2b in company with yawing of the vehicle itself is computed using following formula (2).

$$M = (\theta/\phi) \cdot N = (\Delta\theta \cdot \Delta T/\phi) \cdot N \qquad (2)$$

Pixel number M stored in stored images 2b in company with yawing of the vehicle itself computed using formula (2) represents the blurring degree of the images. Consequently, storage time ΔT is determined such that M becomes similar to a prescribed value (>1). Also, the prescribed value for approximating M is the value needed for obtaining sufficient blurred images for computing the FPN correction data, and it is set corresponding to the value of yawing rate Δθ. As a result, it is possible to compute the optimum value of storage time ΔT corresponding to the behavior of the vehicle during storage of stored images 2b.

Figure 5:
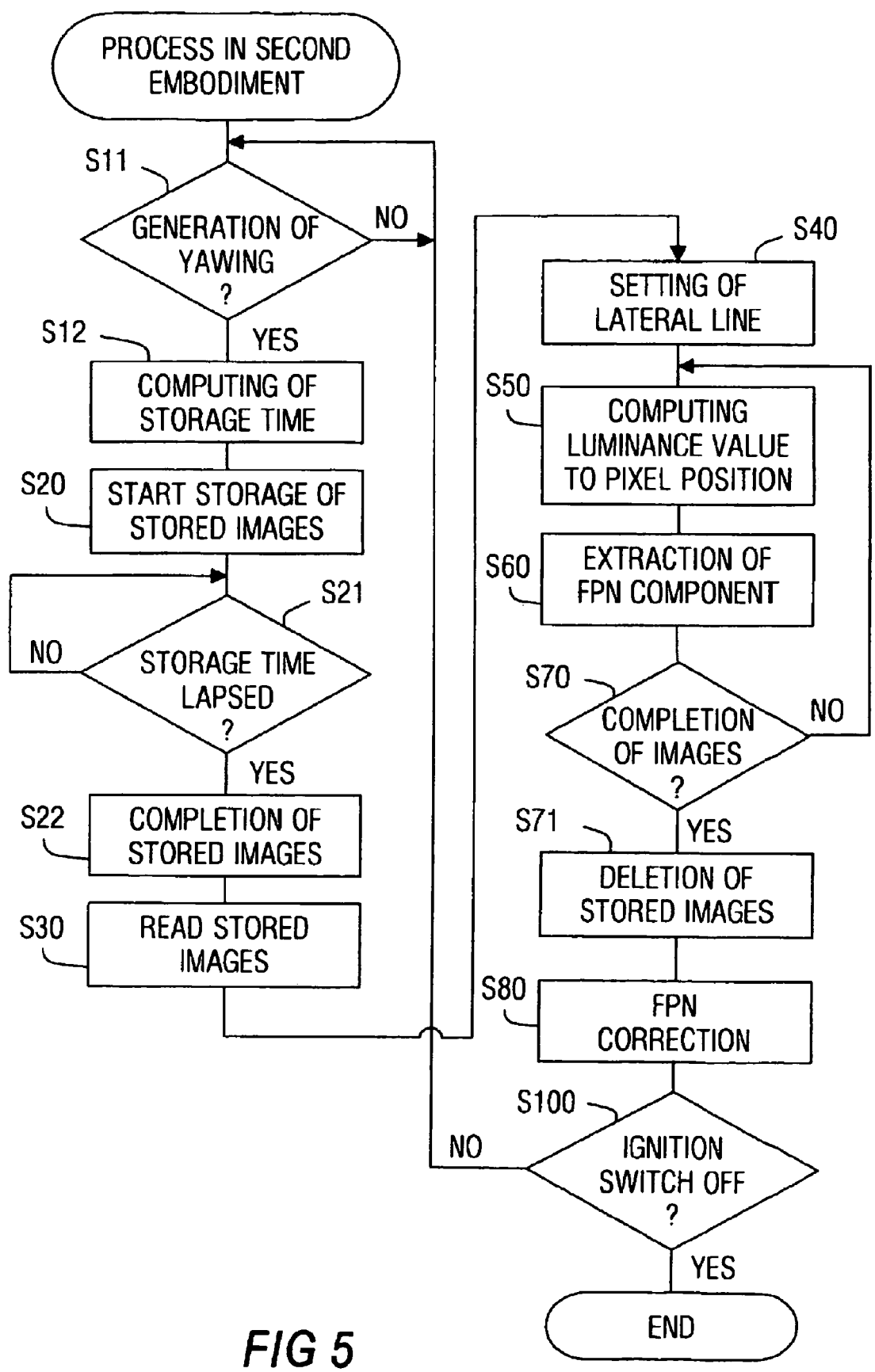
FIG. 5 is a flow chart illustrating the method of operation of an image processing device in accordance with a second embodiment of the invention.

FIG. 5 is a flow chart of the process of vehicle-mounted image processing device 100 in the second embodiment. In the process shown in FIG. 5, after the ignition switch of the vehicle is turned ON, the power source of vehicle-mounted image processing device 100 is turned ON, and the process is executed with controller 103. Also, in FIG. 5, the same step numbers as those in the first embodiment shown in FIG. 1 are adapted, so that only the different features will be explained. In step S11, a decision is made as to whether yawing takes place in the vehicle itself. If it is decided that yawing took place in the vehicle itself, the process goes to step S12.

In step S12, the yawing rate of the vehicle itself is computed, and, as explained above, by formulas (1) and (2), the optimum value of storage time ΔT is computed corresponding to the value of Δθ that has been computed. Then the process goes to step S20, and storage of stored images 2b is started. Then, the process goes to step S21. In step S21, a decision is made as to whether the computed storage time ΔT has elapsed. If it is decided that storage time ΔT has elapsed, the process goes to step S22. In step S22, storage of stored images 2b comes to an end, and the process goes to step S30.

Also, in step S71, based on stored images 2b stored during storage time ΔT, the FPN component is extracted, and the FPN correction data are computed. Then, because stored images 2b stored in image memory 102 are not needed, they are deleted. Then, when it is detected again in step SI1 that yawing took place in the vehicle itself, based on the storage time computed corresponding to the yawing rate in this case, stored images 2b are again stored.

In the second embodiment explained above, in addition to the effects of the first embodiment, the following operation and effects can be realized.

(1) Storage of images is performed only when yawing takes place in the vehicle itself. As a result, when yawing takes place in the vehicle, because the variation in the images captured consecutively in the lateral direction is large, it is possible to obtain sufficient blurred images in a short storage time.

(2) Storage time ΔT is determined such that number of pixels M stored in stored images 2b in company with yawing of the vehicle itself as computed using formula (2) is near a prescribed value (>1) preset corresponding to the value of yawing rate Δθ. As a result, it is possible to compute the optimum value of storage time ΔT corresponding to the behavior of the vehicle while stored images 2b are stored.

(3) Because only the images during the computed storage time are stored in image memory 203, it is possible to reduce the size of the stored images, and it is possible to reduce the size of the images as the image processing object. Consequently, it is possible to increase the processing speed.

Third Embodiment

With the third embodiment, when the vehicle windshield wipers are on, only the area in which the wiper appears is extracted from the images captured and stored images are obtained on which the extracted area is superimposed. Then FPN correction data are extracted from the stored images by executing image processing explained below, and FPN correction is performed to remove noise.

Figure 6:
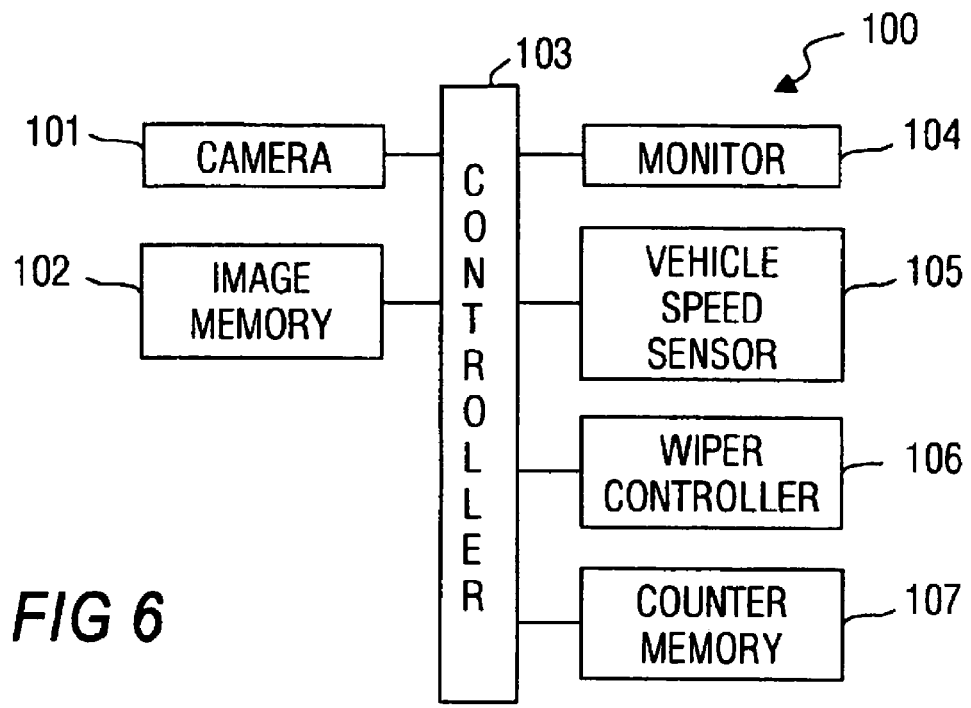
FIG. 6 is a block diagram of an image processing device according to a third embodiment of the invention.

FIG. 6 is a block diagram showing the construction of an embodiment of a vehicle-mounted image processing device in a third embodiment. In FIG. 6 the same symbols are assigned for the same components as those in FIG. 1 for the first embodiment and the explanation will emphasize the differences. Vehicle-mounted image processing device 100 is provided with wiper controller 106 that controls operation of the vehicle wipers and counter memory 107 that stores the count value for the pixel count explained below. Here, the actual examples of graphs showing the luminance output values at each pixel position in the horizontal direction on the lateral line shown in FIGS. 3A-3C are the same as the first embodiment, so their explanation is omitted.

With the third embodiment, when an input device, not shown, is operated by the user and execution of FPN correction is instructed, controller 103 controls wiper controller 106 to start operation of the wipers. Then while the wipers are operating, only the areas in which the wipers appear are extracted from the frames captured by camera 101 and are stored in image memory 102 while superimposing the extracted areas. Note that execution of FPN correction, rather than starting when instructed by the user, could be executed at a prescribed timing at fixed time intervals.

In this embodiment, the speed of movement is calculated based on the images of objects present in the images and, as explained below, taking into account that the speed of movement based on the images of the wipers in the images and the speed of movement based on the images of other objects present in front of the vehicle differ greatly due to their different distances from camera 101, the area in which the wipers appear is extracted from the images.

First, the speed of movement of objects present in the images is calculated based on the images and the optical flow representing the direction of movement and speed of movement of objects in the picked-up images as vectors is calculated as follows. That is, the edges of objects present in the images are extracted by binarization using a prescribed threshold value for picked-up images captured by camera 101. A line-thinning process is performed for the extracted edges in the images to accurately find the centers of the edges. Then the thinned edges are expanded so that the edge width will be a fixed width, for example, 3 pixels. By normalizing extracted edges in this way, an edge image in which each image has a uniform thickness can be obtained.

Figures 7A, 7B, 7C:
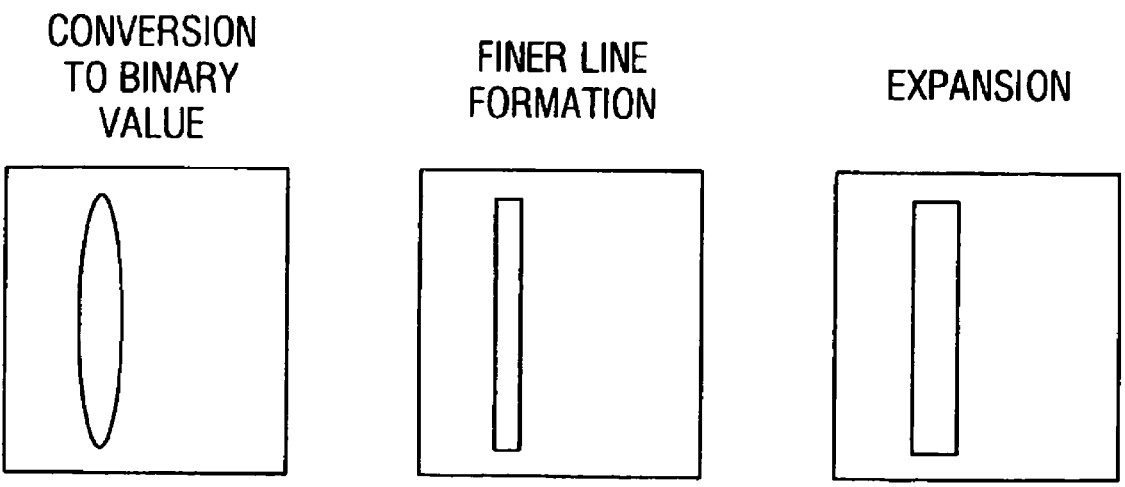
FIG. 7A shows an image in which an edge in a stored image has been extracted through binarization.
FIG. 7B shows the image of FIG. 7A after it has been subjected to a line-thinning processes.
FIG. 7C shows the image of FIG. 7B after it has been expanded to a fixed width.

Note that FIGS. 7A-7C show an actual example of the entire process for normalizing the extracted edges to obtain edge images. That is, line thinning is performed for the edges obtained by binarization shown in FIG. 7A to obtain the edge after line thinning shown in FIG. 7B. Then the thinned edge is expanded to produce a fixed-width in the edge as shown in FIG. 7C.

Next, the count value for the pixel counter corresponding to the pixel where the edge is situated within the current edge images within the pixel counters stored in counter memory 107 is updated. The pixel counter is a counter corresponding to each pixel of an edge image, 1 is added to the count value for the pixel corresponding to the pixel where the edge is, and the count value of the pixel counter corresponding to a pixel in which there is no edge is initialized at 0. By updating the counter value for each frame captured consecutively by camera 101 with a pixel in which the edge presence time is long, the count value will be large, and with a pixel in which the edge presence time is short, the count value will be small.

Then, the difference in edge presence times is calculated by finding the difference between the count values for pixel counters corresponding to individual pixels adjacent laterally in an edge image and the time required for the edge to move by 1 pixel is obtained. Then by obtaining the inverse ofthat value, the speed in the lateral direction within the image space at each pixel can be calculated. The speed in the lateral direction within the image space at each pixel corresponds to the speed in the lateral direction of the edge included at each pixel. The speed of an edge in the vertical direction can also be calculated by looking at individual pixels adjacent in the vertical direction and performing the same processing. With this, speed information for an edge at each pixel on an image, that is, the direction of movement and the speed of movement of the edge, can be calculated.

The optical flow representing the direction of movement and the speed of movement of an object on an image calculated with the process above as a vector is calculated, and based on the optical flow, the area in which the wiper appears is extracted from the image. That is, taking into account that the speed of movement based on the images of the wiper in the images and the speed of movement based on the images of other objects present in front of the vehicle differ greatly as explained above, the area in which the wiper appears is extracted from the images.

For example, letting the focal distance of camera 101 be 1, the distance from the focus position of camera 101 to an object present in an image be Z, the width of an object in real space be r, and the width of an object on an image be x, the relational expression shown in following Formula (3) is given.

$$x=(1/Z)\chi r \qquad (3)$$

Then, differentiating Formula (3) over time t, the speed of movement of an object in the images is obtained with following Formula (4).

$$dx/dt=(1/Z)\times dr/dt \qquad (4)$$

Figure 8:
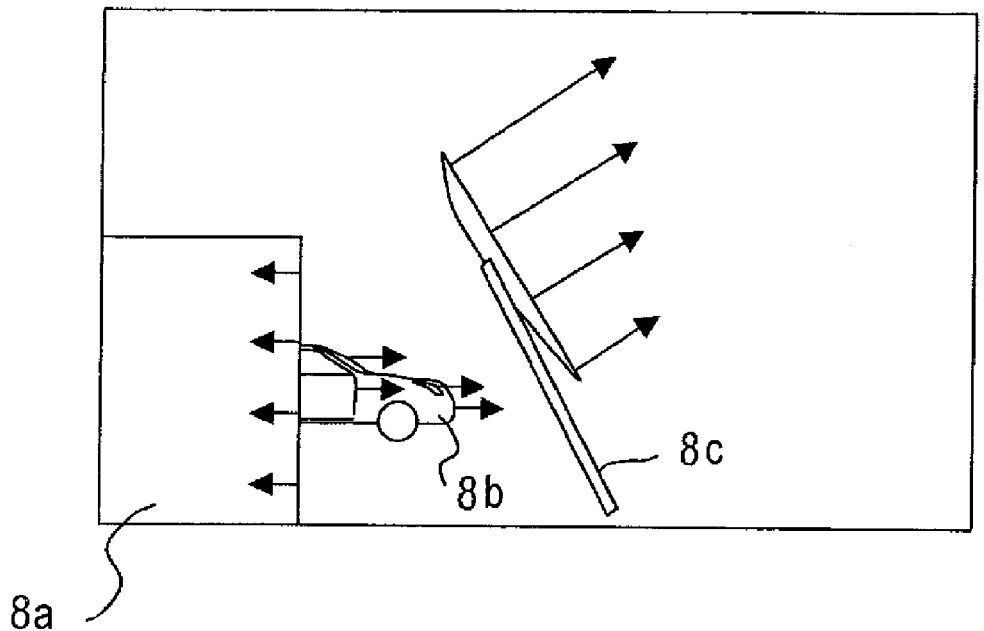
FIG. 8 shows an exemplary image of objects, including a car, a wiper blade and a wall, captured by the image processing device shown in FIG. 6.

From Formula (4), it can be seen that the speed of the object in the images is inversely proportional to distance Z from the focal position of camera 101 to the object present in the images and is proportional to the speed of the object in real space. For example, consider when wall 8a, another vehicle 8b moving forward in front of this vehicle and wiper 8c are present in the picked-up image as shown in FIG. 8. In this case, the distance from the focal position of camera 101 to the other vehicle 8b is 10 m, the other vehicle's speed in real space is 100 km/h ($\approx$27 m/sec) and the distance from the focal position of camera 101 to wiper 8c is 10 cm. Assuming the speed in real space to be 1 m/sec, from Formula (2), the speed of movement v1 of the other vehicle 8b based on the images and the speed of movement v2 of wiper 8c based on the images are calculated by following Formulas (5) and (6).

$$v1=27/10=2.7 \qquad (5)$$

$$v2=1/0.1=10 \qquad (6)$$

From the results calculated by Formulas (5) and (6), it can be seen that speed of movement v2 of wiper 8c on the images under the conditions is detected to be about 3 times faster than the speed of movement v1 of the other vehicle 8b on the images. Considering that even for an object moving at high speed at an extremely short distance in real space, such as the other vehicle 8b that travels at a point 10 m in front of this vehicle at a speed of 100 km per hour in this way, on the images, only a speed of movement about ⅓ of the wiper speed is detected, so an object for which the detected speed of the object based on the images is above a prescribed threshold value, for example, 5 m/sec, can be determined to be a wiper. Therefore, in the optical flow, by extracting the area in which the speed of movement of the edges included in the pixels is above a prescribed threshold value, the area in which a detected edge is included can be extracted from the wiper, and the area in which the wiper appears can be extracted from the picked-up images.

Figure 9:
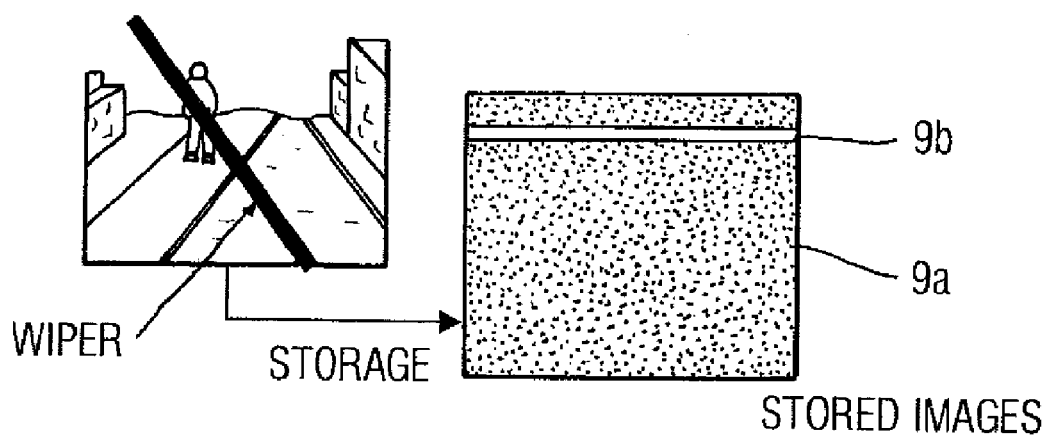
FIG. 9 shows an example of images stored by the image processing device shown in FIG. 6.

By continuing to store the area extracted from the frames in which the wiper appears in this way superimposed in image memory 102 as described above, a uniform black image can be obtained as stored image 9a as shown in FIG. 9. Specific pixels, for example, lateral line 9b that has a height of 1 pixel, are set for the image vertical direction for stored image 9a just as in the first and second embodiments. Stored image 9a, which is a uniform black image, is an image corresponding to the stored image 2b in the first and second embodiments, that is, a blurred image, so that calculating the luminance output value at each pixel position in the horizontal direction in the area on stored image 9a enclosed by lateral line 9b will be as shown in FIGS. 3A-3C.

Therefore, by applying a high pass filter (HPF) to the luminance output value characteristics for a pixel position in the horizontal direction on lateral line 9b shown in FIG. 3A and extracting the high spatial frequency component within lateral line 9b just as in the first embodiment, only the FPN component for a pixel position in the horizontal direction within lateral line 9b can be extracted as shown in FIG. 3C.

Thus, if the high spatial frequency component is extracted for each lateral line 9b for all of stored image 9a, FPN components generated in pixel units in stored image 9a can be extracted. FPN correction is performed for the picked-up images captured consecutively by camera 101 using the extracted pixel unit FPN component as FPN correction data. That is, the difference between the picked-up images captured consecutively by camera 101 and the FPN correction data is calculated and the calculated result is output to monitor 104 as an image after FPN correction. With this, fixed pattern noise can be removed from the picked-up images and picked-up images are displayed on monitor 104. Note that in this embodiment, FPN correction is assumed to be executed at prescribed time intervals, for example, 1-second intervals, after wiper operation is started.

Figure 10:
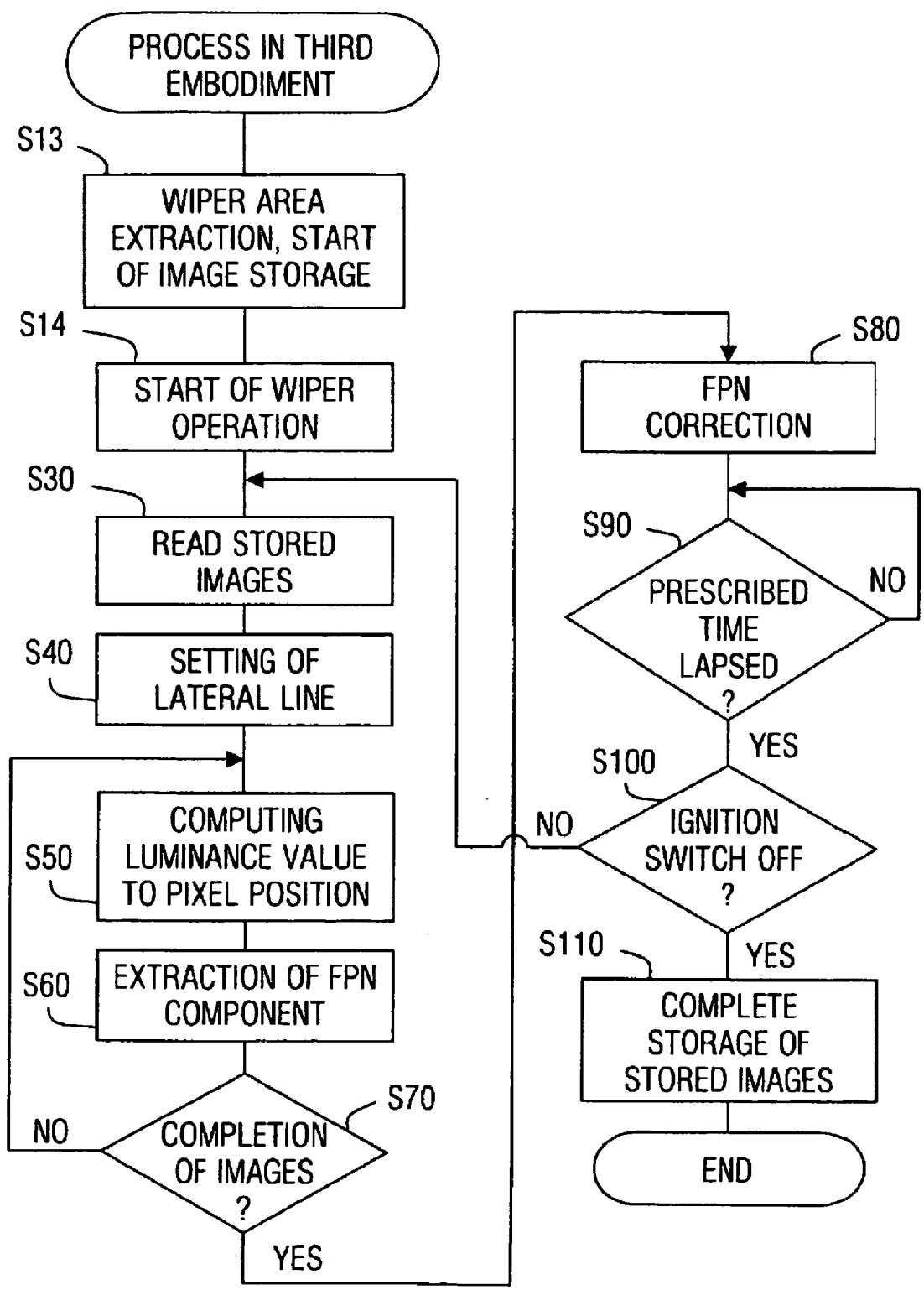
FIG. 10 is a flow chart illustrating the method of operation of the image processing device shown in FIG. 6.

FIG. 10 is a flow chart showing the process of vehicle-mounted image processing device 100 in the third embodiment. The process shown in FIG. 10 is executed by controller 103 when an input device, not shown, is operated by the user and starting of FPN correction is instructed. Note that in FIG. 10, the same step numbers are assigned to the same processing content as the process in the first embodiment shown in FIG. 4 and the explanation will emphasize the differences. Also, as described above, execution of FPN correction, rather than starting when instructed by the user, could be executed at a prescribed timing at fixed time intervals.

At step S13, wiper controller 106 is controlled, wiper operation is started, and the process advances to step S14. At step S14, the area in which the wiper appears (wiper area) is extracted from the picked-up images as described above and storage in image memory 102 is started. That is, the wiper area extracted from the images captured consecutively by camera 101 is stored and superimposed and stored image 9a is obtained. Next, the processing advances to step S30 where the same process as for the first embodiment is executed for stored image 9a.

With the third embodiment explained above, in addition to the operation and effects of the first embodiment, effects as described below can be obtained.

(1) Only the area in which the wiper appears is extracted from the images captured consecutively by camera 101, FPN correction data are extracted based on the stored image obtained with that area superimposed, and FPN correction is performed for the stored image. With this, FPN correction data can be obtained while images are being captured and extraction of correction data in real time is possible.

(2) Because FPN correction data are calculated based on images stored with the wiper image superimposed, it is not necessary to mount any special equipment for calculating FPN correction data, which is economically beneficial.

(3) The range in which the movement speed of an edge in the images is above a prescribed threshold value will be detected as an area in which the wiper appears. With this, considering that the speed of movement based on the image of the wiper in the images is detected to be faster than the speed of movement based on the image of another object present in front of the vehicle, the wiper area can be detected with high precision.

Fourth Embodiment

In the fourth embodiment, the FPN correction data computed as described in the first through third embodiments are used to correct the offset of the various pixels and the scattering of the gain of the images captured consecutively with camera 101. Regarding a specific example of the stored images and a specific example of a graph illustrating the luminance output value at the various pixel positions in the horizontal direction in lateral lines 2c and 9b as shown in FIGS. 3A-3C and 9, they are the same as that in the first through third embodiments, and will not be explained again.

Figure 11:
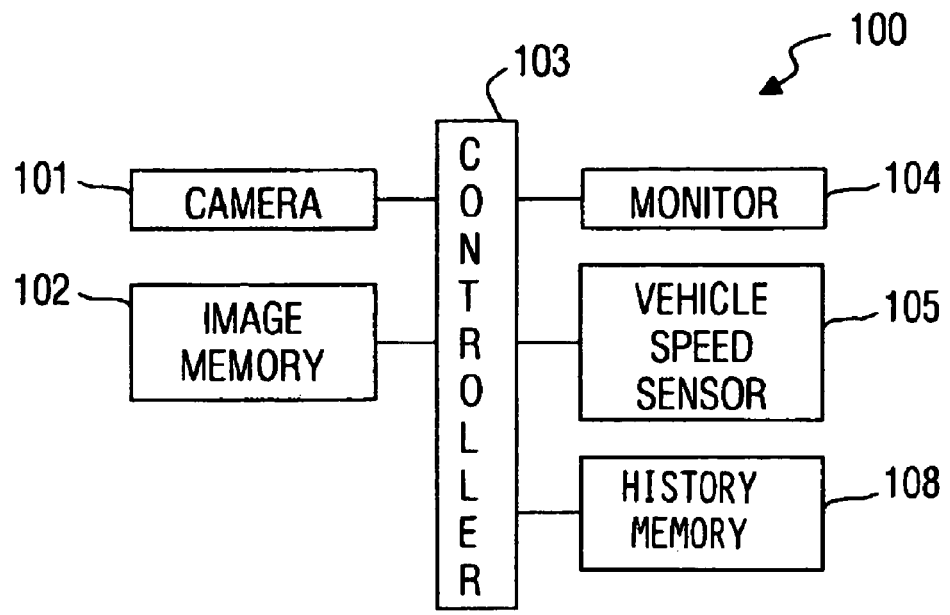
FIG. 11 is a block diagram of an image processing device according to a fourth embodiment of the invention.

FIG. 11 is a block diagram illustrating the construction of an embodiment of the vehicle-mounted image processing device in the fourth embodiment. The same symbols as those of the corresponding structural elements in FIG. 1 of the first embodiment are adapted in this case, so only features with a difference will be explained. In order to simplify the explanation, an example of a construction in combination with the first embodiment will be explained. However, it is also possible to form a combination with the third embodiment shown in FIG. 6. The vehicle-mounted image processing device 100 has history memory 108 that stores as history the characteristics of the luminance output value with respect to the pixel position in the horizontal direction for each lateral line 2c in stored images 2b when the FPN correction data are computed.

In the fourth embodiment, an example of executing the process for each lateral line 2c in stored images 2b in the first and second embodiments will be explained, but the process could also be executed for each lateral line 9b in stored images 9a in the third embodiment.

With a prescribed time interval, controller 103 extracts the characteristics with the highest luminance output value and the characteristics with the lowest luminance output value for each lateral line 2c of each of the stored images 2b stored in history memory 108. That is, the characteristics of the high luminance and the characteristics of the low luminance at the position of any lateral line 2c at the same longitudinal position on the image are extracted. The characteristics for the high luminance are extracted from, e.g., stored images 2b that have been stored during operation on good roads in the daytime, and the characteristics for the low luminance are extracted from stored images 2b that have been stored during operation in, e.g., tunnels. Then, HPF is applied to the extracted characteristics for the high luminance and characteristics for the low luminance, respectively, and the FPN correction data are computed for the high luminance and low luminance in any lateral line 2c.

Figure 12:
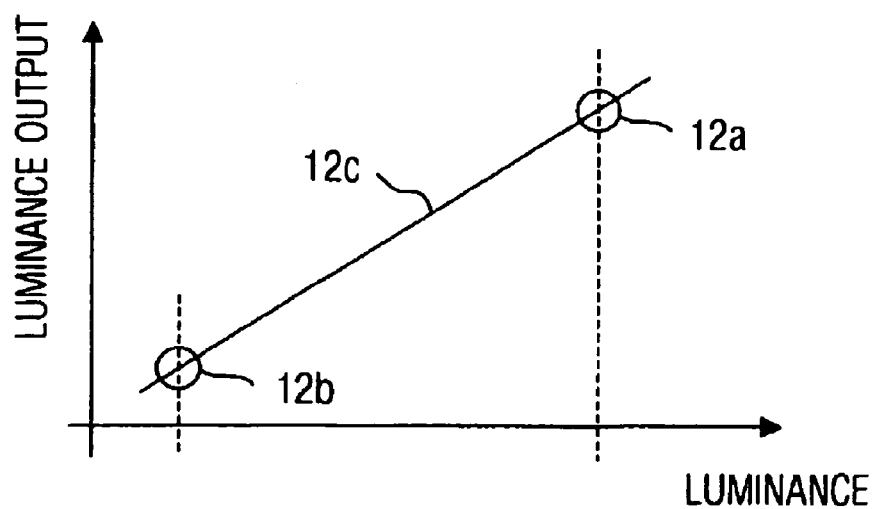
FIG. 12 is a graph of FPN correction data extracted from an image taken in bright light, and an FPN correction data extracted from an image in low light, along with a straight line therebetween, in accordance with the fourth embodiment shown in FIG. 11.

For the extracted FPN correction data, the FPN correction data of the high luminance and the FPN correction data of the low luminance at any pixel are plotted as graphics with the X-axis representing the luminance and the Y-axis representing the luminance output value. That is, FPN correction data 12a of high luminance and FPN correction data 12b of low luminance are plotted on a graph as shown in FIG. 12. Then, the two plotted points are connected with straight line 12c represented by a linear function with following formula (7).

$$y = ax + b \quad (7)$$

Here, in formula (7), as explained above, y represents the luminance output value, and x represents the luminance. Also, the relationship among the luminance output value, gain, offset and luminance is represented by following formula (8).

$$\text{Luminance output value} = \text{gain} \times \text{luminance} + \text{offset} \quad (8)$$

Consequently, with formulas (7) and (8), a=gain and b=offset, and, by computing the slope of straight line 12c shown in formula (7), it is possible to compute the correction value of the gain at any pixel, and it is possible to compute the correction value of the offset at any pixel by computing the intersection point with the Y-axis. By performing the process on the stored images when computing the correction value for all the pixels, the correction values of gain and offset are computed for all the pixels. Based on these results, it is possible to perform gain correction and offset correction for the images captured consecutively with camera 101, and it is possible to improve the uniformity of each image.

Figure 13:
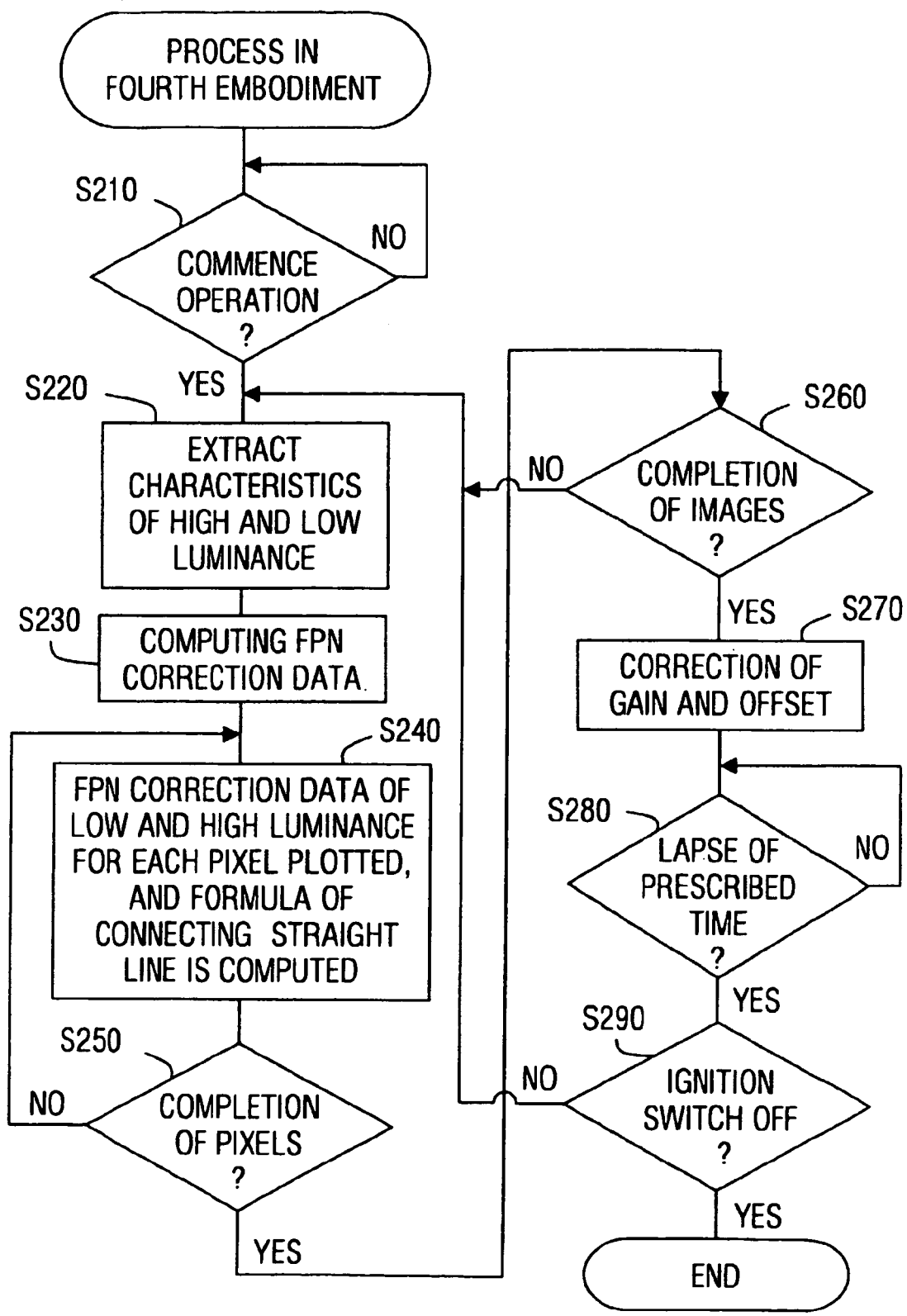
FIG. 13 is flow chart illustrating the method of operation the image processing device shown in FIG. 11.

FIG. 13 is a flow chart illustrating the process of vehicle-mounted image processing device 100 in the fourth embodiment. The process shown in FIG. 13 is executed by controller 103, parallel to the process described in the first through third embodiments. In step S210, based on the output of vehicle speed sensor 105, a decision is made on whether the vehicle itself has started operation. If it is determined that the vehicle itself has started operation, the process goes to step S220. In step S220, for each lateral line 2c of each of stored images 2b stored in history memory 108, the characteristics with the highest luminance output and the characteristics with the lowest luminance output are extracted. Then the process goes to step S230.

In step S230, as explained above, based on the extracted characteristics with the highest luminance output value and the characteristics with the lowest luminance output value, the FPN correction data of the high luminance and those of the low luminance are computed in any lateral line 2c. The process then goes to step S240. In step S240, the FPN correction data of high luminance and the FPN correction data of low luminance at any pixel are plotted in the graph shown in FIG. 12. The formula of straight line 12c that connects the two points is computed, and the correction values of the gain and offset at any pixel are computed. Then the process goes to step S250.

In step S250, a decision is made on whether the process of step S240 has been performed for all the pixels present in any lateral line 2c. If it is decided that the process has been performed for all the pixels, the process goes to step S260. In step S260, a decision is made on whether the processing of steps S220-S250 has been carried out for all stored images 2b. If it is decided that the process has not been completed for all stored images 2b, the process of steps S220-S250 is repeated until the process is completed for all stored images 2b. On the other hand, if it is decided that the processing has been completed for the entirety of stored images 2b, the process goes to step S270.

In step S270, based on the computed correction values of the gain and offset for each pixel, the gain and offset of the images captured consecutively with camera 101 are corrected. Then the process goes to step S280. In step S280, a decision is made on whether the prescribed time as the interval for execution of the gain/offset correction treatment has elapsed. If it is decided that the prescribed time has not elapsed, the process stops at step S280 until the prescribed time elapses. On the other hand, if it is determined that the prescribed time has elapsed, the process goes to step S290. In step S290, a decision is made on whether the ignition switch of the vehicle is OFF. If it is not OFF, the process returns to step S220, and the process is repeated. On the other hand, if it is determined that the ignition switch is OFF, the process comes to an end.

In the aforementioned fourth embodiment, based on the FPN connection data of the high luminance and the FPN correction data of the low luminance at the same pixel, the correction values of the gain and offset of the pixel are computed. Consequently, it is possible to accurately correct for the scattering of the gain and offset of each pixel.

Also, the following modifications can be performed.

(1) In the first through fourth embodiments, HPF is applied to the characteristics of the luminance output value with respect to the pixel position in the horizontal direction in lateral line 2c or 9b, and the high spatial frequency component in the horizontal direction in lateral line 2c or 9b is extracted. However, one may also adopt a scheme in which a low-pass filter (LPF) is applied to the characteristics of the luminance output value with respect to the pixel position in the horizontal direction of lateral line 2c or 9b, the low spatial frequency component in lateral line 2c or 9b is extracted, and the high spatial frequency component in lateral line 2c or 9b is extracted by taking the difference between the characteristics of the luminance output value with respect to the pixel position in the horizontal direction in lateral line 2c or 9b and the extracted low spatial frequency component in lateral line 2c or 9b.

(2) In the second embodiment, yawing is detected as behavior of the vehicle, and, when yawing takes place for the vehicle, FPN correction is carried out. However, one may also adopt the following scheme: for example, the vehicle speed or pitching or other vehicle behavior is detected, and, when this vehicle behavior takes place, FPN correction is carried out. In addition, when the vehicle speed or pitching is detected, it is necessary to set a separate algorithm for computing storage time $\Delta T$ of the stored images corresponding to the state of the vehicle speed and pitching in order to perform FPN correction.

(3) In the first through third embodiments, the region divided in the horizontal direction with respect to stored images 2b or 9a is set as lateral line 2c or 9b, and the process of computing of the FPN correction data is executed for each lateral line 2c or 9b. However, one may also adopt a scheme in which an image region divided vertically with respect to stored images 2b or 9a is set as a longitudinal line, and the process of computing of the FPN correction data is executed for each longitudinal line. In this case, in the fourth embodiment, too, it is necessary to perform the processing for each longitudinal line.

For example, in the second embodiment as explained above with modified example (2), when yawing, pitching or other vehicle behavior takes place in the vehicle itself, the dividing direction of stored images 2b may be changed corresponding to the detected behavior of the vehicle. That is, when yawing takes place in the vehicle itself, since the change in the horizontal direction is large in the images captured consecutively with camera 101, the region divided horizontally with lateral line 2c is captured as the object, and it is possible to extract the FPN component based on the more blurred images. On the other hand, when pitching takes place, in the images captured consecutively with camera 101, variation in the vertical direction is larger, so that by capturing the region divided vertically with the longitudinal line as an object, it is possible to extract the FPN component based on the more-blurred images.

In this way, when the occurrence of yawing in the vehicle itself is detected, stored images 2b are divided with lateral line 2c ; and, when the generation of pitching in the vehicle itself is detected, stored images 2b are divided with the vertical line, and it is possible to extract the FPN component with higher precision.

(4) With the third embodiment, an example was explained in which to calculate the optical flow, after edge extraction processing is performed for the picked-up images to obtain edge images, the pixel counter for pixels at which an edge is present is updated, the difference in edge presence time at each pixel is calculated by finding the difference in count values for pixel counters corresponding to individual adjacent pixels, and the time required for the edge to move by 1 pixel is obtained. However, the method is not limited to this and the optical flow could also be calculated using a gradient method or block-matching method, which are usual techniques, for example.

(5) In the first through fourth embodiments, examples were explained in which the front of the vehicle is photographed with camera 101, but the embodiments are not limited to these examples and can also be applied to cases in which the rear of the vehicle is photographed with camera 101.

(6) In the first through fourth embodiments, examples in which vehicle-mounted image processing device 100 based on the present invention is carried on a vehicle were explained. However, the present invention is not limited to this scheme. It is also possible to carry it on other types of moving bodies.

In the following, an explanation will be given regarding the corresponding relationships between the structural elements of the claims and the embodiments. Camera 101 corresponds to the image pickup means; image memory 102 corresponds to the storage means; controller 103 corresponds to the extracting means, image correction means, storage time setting means, behavior detecting means, wiper area extraction means, speed calculation means and gain/offset correction means.

This application is based on Japanese Patent Application No. 2004-300568, filed Oct. 14, 2004 in the Japanese Patent Office, the entire contents of which are hereby incorporated by reference, and on Japanese Patent Application No. 2005-098588, filed Mar. 30, 2005, the entire contents of which are hereby incorporated by reference.

Also, the above-mentioned embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An image processing device for removing fixed pattern noise in images captured by an image pickup device mounted on a vehicle, comprising:
   (a) memory on which is stored a plurality of images captured by the image pickup device while the vehicle is running; and
   (b) a controller operatively coupled to the memory and adapted to generate correction data by extracting high spatial frequency components from portions of the stored images, and to use the correction data to remove fixed pattern noise from images captured by the image pickup device.

2. The image processing device of claim 1, wherein the controller is further adapted to use a high pass spatial frequency filter to extract the high spatial frequency components.

3. The image processing device of claim 1, wherein the controller is further adapted to use a low pass spatial frequency filter to extract the high spatial frequency components.

4. The image processing device of claim 1, further comprising:
   a sensor adapted to be mounted to the vehicle and to output a behavior signal indicating whether the vehicle is undergoing a detected type of movement;
   wherein the controller is further adapted to store in memory the images captured by the image pickup device in response to the behavior signal indicating that the vehicle is undergoing the detected type of movement.

5. The image processing device of claim 4, wherein the detected type of movement is a yaw movement that is sufficient to blur the images captured by the image pickup device, and wherein the controller is further adapted to extract the correction data from horizontally-oriented portions of the images.

6. The image processing device of claim 4, wherein the detected type of movement is a pitch movement that is sufficient to blur the images captured by the image pickup device, and wherein the controller is further adapted to extract the correction data from vertically-oriented portions of the images.

7. The image processing device of claim 4, wherein the controller is further adapted to store the images in the memory during a time period that varies with the rate of the detected type of movement.

8. The image processing device of claim 7, wherein the controller is further adapted to store the images in memory during a time period that varies inversely with the rate of the detected type of movement.

9. The image processing device of claim 1, further comprising:
   a wiper area extractor adapted to extract, from the images captured by the image pickup device, a plurality of areas that correspond to windshield wipers;
   wherein the controller is further adapted to superimpose the plurality of extracted windshield wipers areas to form one or more of the stored image portions from which correction data is extracted.

10. The image processing device of claim 9, wherein the wiper extractor is adapted to calculate speed of objects in the images captured by the image pickup device, and to extract as the windshield wiper areas the objects in the images having a speed above a prescribed value.

11. The image processing device of claim 1 wherein the processor is further adapted to extract a high spatial frequency component for which a luminance output value is highest in the stored images and a high spatial frequency component for which a luminance output value is lowest in the stored images, and to adjust the gain and offset of the images captured by the image pickup means based on the high spatial frequency component at high luminance and the high spatial frequency component at low luminance.

12. The image processing device of claim 1, wherein each image of the plurality of images includes a luminance output value for a plurality of portions of that image; and wherein the controller is configured to generate the correction data by extracting the high spatial frequency components from the luminance output values of the stored images and to use the correction data to remove fixed pattern noise from the images by computing a difference between the stored images and the correction data.

13. An image processing device for removing fixed pattern noise from images captured by an image pickup device mounted on a vehicle, comprising:
   (a) storage means for storing a plurality of images captured with the image pickup means;
   (b) extracting means for extracting a high spatial frequency component contained in the images in the storage means and for generating correction data for removing the fixed pattern noise based on the high spatial frequency component; and
   (c) image correcting means for removing fixed pattern noise from the images captured with the image pickup means based on the correction data.

14. The image processing device of claim 13, wherein the storage means stores images captured by the image pickup device while the vehicle is traveling.

15. The image processing device of claim 13, further comprising:
- (d) behavior detecting means for detecting behavior of the vehicle;
- (e) storage time setting means for determining a time period during which images captured by the image pickup means will be stored in the storage means based on the behavior of the vehicle detected by the behavior detecting means; and
- wherein the storage means stores the images captured by the image pickup means for the duration of the storage time set by the storage time setting means.

16. The image processing device of claim 13, further comprising:
- wiper area extraction means for extracting areas in which a wiper is present from the images captured by the image pickup means; wherein the storage means stores a plurality of wiper areas that have been extracted from the images by the wiper area extraction means.

17. The image processing device of claim 16, wherein the wiper area extraction means further comprises:
- speed calculation means for processing the images captured by the image pickup means to calculate speed information for the images; wherein each area on the images for which speed above a prescribed value is calculated is extracted as one of the plurality of wiper areas based on the image speed information calculated by the speed calculation means.

18. The image processing device of claim 13, further comprising:
- a gain offset means for extracting the high spatial frequency component for which a luminance output value is highest in the stored images and a high spatial frequency component for which the luminance output value is lowest in the stored images, and for correcting gain and offset of the images captured by the image pickup means based on the high spatial frequency component at high luminance and the high spatial frequency component at low luminance to improve the uniformity of the images.

19. A vehicle having an image processing device for removing fixed pattern noise in images, comprising:
- (a) a vehicle having a camera mounted thereto, the camera including an image-pickup element generating as output a plurality of images, each image of the plurality of images having a luminance output value for a plurality of portions of that image;
- (b) memory on which is stored the plurality of images generated by the image pickup element while the vehicle is running; and
- (c) a controller operatively coupled to the memory and adapted to generate correction data by extracting high spatial frequency components from the luminance output values of the portions of the stored images, and to use the correction data to remove fixed pattern noise from images captured by the image pickup element by computing a difference between the stored images and the correction data.

20. The vehicle of claim 19, further comprising:
- a sensor mounted to the vehicle and adapted to output a behavior signal indicating whether the vehicle is undergoing a detected type of movement;
- wherein the controller is further adapted to store in memory the images captured by the image pickup element in response to the behavior signal indicating that the vehicle is undergoing the detected type of movement.

21. The vehicle of claim 20, wherein the detected type of movement is a yaw movement that is sufficient to blur the images generated by the image pickup element, and wherein the controller is further adapted to extract the high spatial frequency components from horizontally-oriented portions of the images.

22. The vehicle of claim 20, wherein the detected type of movement is a pitch movement that is sufficient to blur the images generated by the image pickup element, and wherein the controller is further adapted to extract the high spatial frequency components from vertically-oriented portions of the images.

23. The vehicle of claim 20, wherein the controller is further adapted to store the images in the memory during a time period that varies with a rate of the detected type of movement.

24. The vehicle of claim 19, further comprising:
- windshield wipers and a wiper controller adapted to generate a wiper activation signal when the windshield wipers are operational;
- wherein the controller is responsive to the wiper activation signal and is further adapted to extract areas of the images that correspond to the windshield wipers, and to superimpose the extracted windshield wiper areas in the memory to form one or more of the stored image portions from which the controller extracts the high spatial frequency components.

25. The vehicle of claim 24 wherein the controller is further adapted to calculate speed of objects in the images and to extract as the windshield wiper areas on the images having a speed above a prescribed value.

26. The vehicle of claim 19 wherein the processor is further adapted to extract a high spatial frequency component for which the luminance output value is highest in the stored images and a high spatial frequency component for which the luminance output value is lowest in the stored images, and to correct gain and offset of the images captured by the image pickup means based on the high spatial frequency component at high luminance and the high spatial frequency component at low luminance.

27. An image processing system for removing fixed pattern noise in images, comprising:
- (a) a camera including an image pickup element generating as output a plurality of images;
- (b) memory on which is stored the plurality of images generated by the image pickup element;
- (c) a controller operatively coupled to the memory and adapted to generate correction data by extracting high spatial frequency components from portions of the stored images, and to use the correction data to remove fixed pattern noise from images captured by the image pickup element; and
- (d) a sensor adapted to output a behavior signal indicating that the camera is undergoing a detected type of movement, wherein the controller is further adapted to store in memory the images captured by the image pickup element in response to the behavior signal indicating the detected type of movement.

28. The image processing system of claim 27, wherein the detected type of movement is a yaw movement that is sufficient to blur the images captured by the image pickup element, and wherein the controller is further adapted to extract the high spatial frequency components from horizontally-oriented portions of the images.

29. The image processing system of claim 27, wherein the detected type of movement is a pitch movement that is sufficient to blur the images captured by the image pickup element, and wherein the controller is further adapted to extract the high spatial frequency components from vertically-oriented portions of the images.

30. The image processing system of claim 27, wherein the behavior signal indicates a rate of the detected type of movement, and the controller is further adapted to store the images in the memory during a time period that varies with the rate of the detected type of movement.

31. The image processing system of claim 27, wherein the controller is further adapted to extract areas of the images that correspond to windshield wipers, and to superimpose the extracted windshield wiper areas in the memory to form at least one of stored image portions from which the controller extracts the high spatial frequency components.

32. The image processing system of claim 31, wherein the controller is further adapted to calculate speed of objects in the images generated by the image pickup element, and to extract as the windshield wiper areas the areas on the images having a speed above a prescribed value.

33. The image processing system of claim 27, wherein the processor is further adapted to extract a high spatial frequency component for which the luminance output value is highest in the stored images and a high spatial frequency component for which the luminance output value is lowest in the stored images, and to correct gain and offset of the images captured by the image pickup means based on the high spatial frequency component at high luminance and the high spatial frequency component at low luminance.

34. An image processing method for removing fixed pattern noise from images captured by an image pickup device mounted on a vehicle, comprising:
 (a) storing a plurality of images captured with the image pickup means;
 (b) extracting a high spatial frequency component contained in the images;
 (c) generating correction data for removing the fixed pattern noise based on the high spatial frequency component; and
 (d) using the correction data to remove fixed pattern noise from the images captured by the image pickup.

35. The image processing method of claim 34, wherein storing the plurality of images takes place while the vehicle is moving.

36. The image processing method of claim 34, further comprising:
 detecting the behavior of the vehicle;
 based on the behavior of the vehicle, determining a time period during which images captured by the image pickup means will be stored; and
 storing the plurality images during the time period.

37. The image processing method of claim 34, further comprising:
 extracting each area in which a wiper is present from images captured by the image pickup device;
 superimposing the wiper areas to define an image having at least one portion that is black; and
 extracting a high spatial frequency component contained in the black portion.

38. The image processing method of claim 37, further comprising:
 processing the images captured by the image pickup means to calculate speed information for the images; and
 extracting as the wiper areas portions of the images for which speed above a prescribed value is calculated.

39. The image processing method of claim 34, further comprising:
 extracting a high spatial frequency component for which the luminance output value is highest in the stored images and a high spatial frequency component for which the luminance output value is lowest in the stored images, and improving the uniformity of the images by correcting gain and offset of the images based on the high spatial frequency component at high luminance and the high spatial frequency component at low luminance.

* * * * *